US011884368B2

(12) United States Patent
Brown et al.

(10) Patent No.: US 11,884,368 B2
(45) Date of Patent: Jan. 30, 2024

(54) LAUNCHING ELONGATE SUBSEA STRUCTURES

(71) Applicant: Subsea 7 Limited, Sutton (GB)

(72) Inventors: Philip Derek Brown, Dyce (GB); Eric Fletcher McEwan, Kingswells (GB)

(73) Assignee: SUBSEA 7 LIMITED, Sutton (GB)

( * ) Notice: Subject to any disclaimer, the term of this patent is extended or adjusted under 35 U.S.C. 154(b) by 0 days.

(21) Appl. No.: 15/733,869

(22) PCT Filed: Jun. 21, 2019

(86) PCT No.: PCT/GB2019/051742
§ 371 (c)(1),
(2) Date: Nov. 30, 2020

(87) PCT Pub. No.: WO2019/243834
PCT Pub. Date: Dec. 26, 2019

(65) Prior Publication Data
US 2021/0221475 A1  Jul. 22, 2021

(30) Foreign Application Priority Data

Jun. 22, 2018  (GB) ..................... 1810310

(51) Int. Cl.
| F16L 1/16 | (2006.01) |
| B63B 21/66 | (2006.01) |
| B63B 21/20 | (2006.01) |
| B63B 22/18 | (2006.01) |
| B63B 35/03 | (2006.01) |
| F16L 1/24 | (2006.01) |

(52) U.S. Cl.
CPC .............. B63B 21/66 (2013.01); B63B 21/20 (2013.01); B63B 22/18 (2013.01); B63B 35/03 (2013.01); F16L 1/24 (2013.01); F16L 1/163 (2013.01)

(58) Field of Classification Search
CPC .. F16L 1/24; F16L 1/163; B63B 22/18; B63B 22/24
See application file for complete search history.

(56) References Cited

U.S. PATENT DOCUMENTS

| 2,731,800 A | 1/1956 | Collins |
| 4,015,435 A * | 4/1977 | Shaw ........................ F16L 1/18 |
| | | 405/166 |

(Continued)

FOREIGN PATENT DOCUMENTS

| DE | 19710465 | 9/1998 |
| EP | 0931965 | 7/1999 |

(Continued)

*Primary Examiner* — Sean D Andrish
(74) *Attorney, Agent, or Firm* — MATTINGLY & MALUR, PC

(57) ABSTRACT

A method of launching an elongate subsea structure such as a pipeline bundle unit into water provides buoyant support to the structure by displacing water with a hollow buoyancy unit that applies buoyant upthrust to the structure. By lowering the buoyancy unit in the water to bring a permanently open aperture of the buoyancy unit beneath a surface level of the water, the buoyancy unit is flooded with water through the or each permanently open aperture to reduce the buoyant upthrust applied to the structure. A corresponding elongate subsea structure is also claimed.

19 Claims, 4 Drawing Sheets

(56) References Cited

U.S. PATENT DOCUMENTS

| | | | |
|---|---|---|---|
| 4,037,425 A | | 7/1977 | Berg |
| 4,067,199 A | | 1/1978 | Jegousse |
| 4,117,693 A | | 10/1978 | Fournie |
| 4,363,566 A | | 12/1982 | Morton |
| 4,786,207 A | | 11/1988 | Morton et al. |
| 2002/0046547 A1 | * | 4/2002 | Bishop .................... F17C 1/002 222/3 |
| 2008/0095583 A1 | | 4/2008 | Giovannini et al. |
| 2017/0146152 A1 | * | 5/2017 | Goodlad .................... F16L 9/19 |

FOREIGN PATENT DOCUMENTS

| | | | |
|---|---|---|---|
| EP | 1033501 | | 9/2000 |
| EP | 1205701 | | 5/2002 |
| GB | 1191146 | * | 5/1970 |
| GB | 2377002 | | 12/2002 |
| GB | 2435316 | | 8/2007 |
| KR | 20140037990 | | 3/2014 |
| WO | WO 00/38974 | | 7/2000 |
| WO | WO 2006/045357 | | 5/2006 |
| WO | WO 2016/001680 | * | 1/2016 |
| WO | WO 2017/199100 | * | 11/2017 |
| WO | WO 2017/212340 | * | 12/2017 |

* cited by examiner

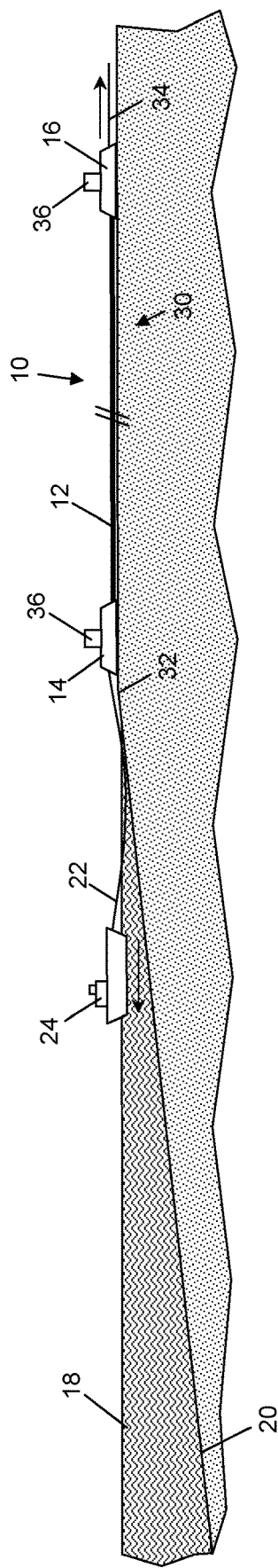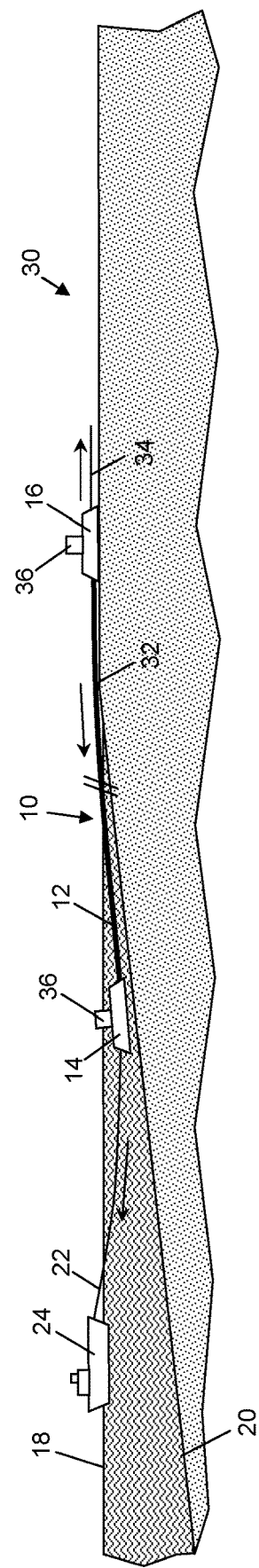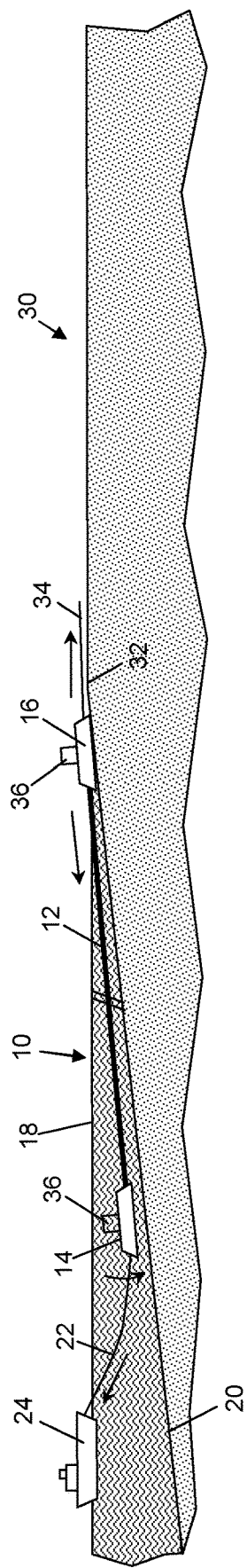

LAUNCHING ELONGATE SUBSEA STRUCTURES

BACKGROUND OF THE INVENTION

This invention relates to the challenges of launching elongate subsea structures, such as pipeline bundles or riser structures, from a fabrication site into an adjacent body of water. The invention relates particularly to the problem of how to vary buoyant support of the structure at different stages of the launch procedure.

Pipeline bundles as used in the subsea oil and gas industry will be used in this specification to exemplify very long subsea structures to which the invention is apt to be applied. Those skilled in the art will appreciate that the invention may also be applied to other similarly lengthy subsea structures used in the industry, such as riser towers.

Pipeline bundles provide robust, efficient and easily-installed subsea flowline systems. For example, pipeline bundles may be installed in oil fields to connect or 'tie back' subsea production wells or manifolds to host facilities or to subsea tie-in points.

A typical pipeline bundle is a few kilometres in length. If a longer tie-back is needed, two or more pipeline bundles may be connected together in longitudinal succession in a 'daisy-chain' arrangement.

The most common pipeline bundle configurations comprise a rigid carrier pipe, rigid flowline pipes and other parallel elongate elements, such as other fluid conduits and power or data cables. The flowline pipes carry production fluids that contain oil and/or gas and the carrier pipe contributes structural strength. The carrier pipe may also contribute buoyancy to the bundle during tow-out to an installation site.

Rigid pipes are to be distinguished from flexible pipes, as those terms are understood by technicians in the subsea oil and gas industry. Yet, those skilled in the art know that rigid pipes have flexibility to bend elastically along their length.

Some pipeline bundle configurations place the flowline pipes and other elongate elements around a carrier pipe that serves as a structural spine. Other pipeline bundle configurations enclose the flowline pipes and other elongate elements within a carrier pipe that surrounds the flowline pipes.

A pipeline bundle may have a towhead at one or both ends. The or each towhead has an enlarged width compared to the pipeline bundle, and comprises valves, connectors and manifolds to facilitate subsea coupling of spool or jumper pipes that integrate the bundle into a production installation when the bundle has been lowered to the seabed. The towheads provide attachments points for chains or lines used for towing the pipeline bundle to an installation site, and may also contribute buoyancy to the bundle during tow-out.

By way of example, FIGS. 1 and 2 of the drawings show a towable bundle unit 10 that comprises a pipeline bundle 12 connecting a leading towhead 14 to a trailing towhead 16. The bundle unit 10 is shown in FIGS. 1 and 2 both interrupted and greatly shortened. Also, the depth of the water between the surface 18 and the seabed 20 will usually be much greater than these schematic views would suggest.

The towheads 14, 16 incorporate buoyancy, or provide for buoyancy to be attached, to offset at least some of their weight during towing. Optionally, the bundle 12 may also contribute some buoyancy to the bundle unit 10 by virtue of air or other gas contained within a sealed carrier pipe. Additional external buoyancy may also be provided on, or attached to, a carrier pipe, a core pipe or other pipes of the bundle 12.

Various towing methods may be used to transport the unit 10 to an offshore installation site. In particular, the bundle unit 10 may be towed at various depths in the water. The choice of towing depth involves a trade-off between various factors. For example, the unit 10 may be surface-towed at or near to the surface 18, which is easiest to manage. However, surface water dynamics may generate fatigue in the pipeline bundle 12, which is the limiting factor that determines the allowable tow distance. Conversely, towing near the seabed 20 protects the bundle 12 from the influence of surface water dynamics and limits risks during subsequent lowering to the seabed 20 at the installation site. However, controlling the bundle unit 10 at depth is more challenging and is only feasible if the contours of the seabed 20 permit.

FIG. 1 shows the preferred option of a mid-water towing method in which the bundle unit 10 is towed at an intermediate depth in the water column between the surface 18 and the seabed 20. Here, the bundle unit 10 is safely clear of the contours of the seabed 20 and yet is beneath significant influence from wave action near the surface 18. Specifically, FIG. 1 shows a favoured mid-water towing method known in the art as the 'controlled-depth towing method' or CDTM, as described in U.S. Pat. No. 4,363,566.

Mid-water towing is a good compromise that ensures low-stress installation without the use of large crane vessels that depend on low sea states. This makes installation less weather-sensitive and reduces the cost of installation vessels significantly. However, mid-water towing requires precise management of buoyancy.

In all towing methods, the bundle unit 10 is held in tension by chains or lines 22 extending fore and aft from the respective towheads 14, 16 to respective installation vessels such as tugs 24. The pipeline bundle 12 acts in tension between the towheads 14, 16 during towing, with tensile loads being borne principally by a carrier pipe or core pipe of the bundle 12.

The speeds of, and spacing between, the tugs 24 are adjusted to keep the bundle unit at the required depth having regard to the effect of drag forces and tension in the chains 22. Optionally, a third patrol/survey vessel 26 ahead of the leading tug 24 surveys the route and monitors the towing operation.

In the CDTM, the pipeline bundle 12 is made slightly negatively buoyant at the required depth by the addition of buoyancy and/or ballast spaced along its length. In the example shown, ballast chains 28 spaced along the bundle 12 add weight that offsets the buoyancy of the bundle 12. As a result of the added ballast weight, the bundle 12 hangs between the towheads 14, 16 as a catenary.

When the unit 10 reaches an installation site, the bundle unit 10 is lowered toward the seabed 20 while the lines 22 are paid out from the tugs 24. The bundle unit 10 can be lowered to the seabed 20 by removing external buoyancy from the unit 10 or by adding ballast to the bundle unit 10. The bundle unit 10 then settles on the seabed 20 as shown in FIG. 2, with the bundle 12 resting on and supported by the seabed 20 between the towheads 14, 16.

A bundle unit like that shown in FIGS. 1 and 2 is fabricated by welding together pipe components at a yard such as a spoolbase that is situated on a coast beside navigable water. The bundle unit is typically disposed endwise to the shoreline and so extends a few kilometres inland. The bundle unit is typically fabricated on rails that extend to the shore.

Once a completed bundle unit has been tested and commissioned, the bundle unit is launched by being advanced longitudinally along the rails into the sea. For this purpose, one or more tugs pull the bundle unit into the sea, using lines such as wires or chains that are connected to the leading towhead. To control the launch operation, hold-back tension may be applied to the bundle unit in opposition to the pull of the tugs.

As an increasing portion of a bundle unit becomes immersed in the sea during a launch operation, it is desirable for that portion of the bundle unit to have some support to offset its weight. This reduces friction with the seabed and minimises the risk of damage to the bundle unit, for example due to the pipeline bundle being bent around a sharply-curved contour of the seabed or shore and hence becoming overstressed. The immersed portion of the bundle unit may be held substantially clear of the seabed; alternatively, a substantial part of the bundle unit may remain in contact with the seabed, hence also being supported by the seabed to some extent.

In addition to any support from the seabed, the weight of the immersed portion of the bundle unit is offset by two forces, namely the buoyancy of the immersed portion and the vertical component of tension in the line that connects the leading towhead to the or each tug. In practice, buoyancy provides most of the support required by the immersed portion of the bundle unit.

Whilst buoyancy may be helpful in earlier stages of the launch operation, there is a need to reduce buoyancy in later stages of the launch operation, and thereafter for towing and installation. Otherwise, an excessively buoyant bundle unit may float at or near to the surface while extending a substantial distance offshore. This exposes the bundle unit to wave motion, making it more difficult to control the launch operation and exposing the bundle unit to fatigue.

A conventional way of removing or reducing buoyancy applied temporarily to a subsea structure is to remove a buoyant element, for example by uncoupling a buoy or by cutting straps that attach such an element to the subsea structure. This requires the buoyant element to be recovered, which adds complexity. There is also a risk the buoyant element could shoot to the surface out of control, where it could cause injury and damage to personnel and vessels at the surface above the subsea structure.

Another conventional way of reducing the buoyancy of a subsea structure is to add ballast. This may be achieved either by adding weighting equipment such as chains or clump weights to the structure or apparatus or by flooding a buoyancy tank of the structure or apparatus with seawater. However, ballasting operations can be challenging or impractical to perform, especially in deep water and on lengthy structures.

Various ways of changing the buoyancy of a subsea structure are known in the art, but all have the drawback of requiring actions to be taken either from the shore or from a vessel on the surface close to the structure.

Typically, U.S. Pat. No. 2,731,800 discloses mounting buoys on a pipeline for pulling and towing. However, this solution remains limited to towing at the surface and so suffers from the risk of fatigue mentioned above. U.S. Pat. No. 4,786,207 teaches retrieval of buoys after launching into water.

In DE 19710465, a buoy can tilt in order to start lowering a first end of a pipeline or bundle. In U.S. Pat. No. 4,117,693, the length of links between a pipeline and buoys is variable.

In WO 00/38974, several buoys are mounted on a pipeline and a cutting system releases the buoys at the surface. EP 0931965 teaches selective release of some buoys. EP 1205701 also discloses releasable links.

In U.S. Pat. No. 4,067,199, buoys are deactivated by an automated self-crushing system. Such a system is too complex.

In WO 2006/045357, valves are mounted on a buoy to adjust depth in water selectively. The valves are actuated by contact of wheels with the seabed. Disadvantageously, this requires proximity to the seabed when in a towing configuration. U.S. Pat. No. 4,037,425 also teaches using valves controlled by a pneumatic system in order to activate flooding of a buoy.

EP 1022501 uses airbags in which the volume of air is modified during towing into water. In GB 2377002 a light fluid, namely kerosene, is used as ballast. Both arrangements are complex, requiring fluid management underwater and resistance to hydrostatic pressure.

BRIEF SUMMARY OF THE INVENTION

Against this background, the invention provides a method of launching an elongate subsea structure into water. The method comprises: providing buoyant support to the structure by displacing water with a hollow buoyancy unit that applies buoyant upthrust to the structure; and by lowering the buoyancy unit in the water to bring at least one open aperture of the buoyancy unit beneath a surface level of the water, flooding the buoyancy unit with water through the or each open aperture to reduce the buoyant upthrust applied to the structure.

Conveniently, flooding takes place without physical intervention. The or each aperture is therefore preferably permanently open. The structure may be negatively buoyant without the buoyant upthrust applied by the buoyancy unit.

The buoyancy unit may be lowered to flood the buoyancy unit by lowering at least part of the structure in the water. The buoyancy unit may be lowered in the water in various ways, for example by increasing a total weight of the structure launched into the water, by increasing a length of the structure launched into the water and/or by advancing the structure into deepening water.

The method of the invention may comprise launching a leading end of the structure into the water, flooding the buoyancy unit and subsequently launching a trailing end of the structure into the water. The structure may be bent elastically along its length during launching.

The structure is suitably pulled into the sea from land during launching, and at least part of the structure may be dragged along the seabed while launching. At least part of the structure is suitably sunk onto the seabed after reducing the buoyant upthrust applied by the buoyancy unit to the structure. This may be followed by lifting the structure from the seabed, towing the structure to an installation site and sinking the structure at the installation site.

The buoyancy unit may be flooded in various ways or in combinations of those ways, for example through at least one open aperture in a side wall of the buoyancy unit or in a top of the buoyancy unit, or at an upper end of a tube or duct that terminates within the buoyancy unit. At least a majority of the buoyancy unit is suitably submerged before the or each open aperture is lowered beneath the surface level of the water.

The buoyancy unit may be flooded through a second open aperture after flooding the buoyancy unit through a first open aperture. In that case, the buoyancy unit may be lowered after flooding through the first open aperture and before flooding through the second open aperture.

Buoyant upthrust is suitably applied to an enlarged towhead of the structure. The structure may also be supported by applying tension to a line attached to the structure.

The inventive concept also embraces an elongate subsea structure, particularly comprising a pipeline bundle, the structure being equipped with a hollow buoyancy unit for applying buoyant upthrust to the structure when immersed in water. The buoyancy unit comprises at least one permanently open aperture through which the buoyancy unit is configured to be flooded with water in use in order to reduce the buoyant upthrust applied to the structure.

The or each permanently open aperture is preferably nearer to an upper end of the buoyancy unit than to a lower end of the buoyancy unit. There may be first and second permanently open apertures at respectively different distances from the lower end of the buoyancy unit.

The or each permanently open aperture is suitably in a side wall of the buoyancy unit, in which case the or each permanently open aperture may be elongated horizontally. The or each permanently open aperture may however be in a top of the buoyancy unit. Alternatively, the buoyancy unit may have a substantially closed top. In another approach, the or each permanently open aperture may be at an upper end of a tube or duct that terminates within the buoyancy unit.

The buoyancy unit is suitably in fixed relation to the structure, and may be attached to an enlarged towhead of the structure, for example above, beside or underneath the structure.

In summary, pulling an elongate bundle unit from the shore into seawater, before towing to an installation site, requires variable buoyancy. It is necessary to provide sufficient lift from the seabed at a point of the slope, but to lose that extra lift force at a second distance once the water is deeper. This ensures that the bundle does not float at or near to the surface where the water dynamics are higher and so are most detrimental in terms of fatigue.

The invention simplifies known variable buoyancy systems. By coupling a buoyancy device of the invention to a pipeline, for example at a towhead, the buoyancy device sinks automatically when enough of the pipeline is in water.

It is, of course, well known that water can flood a chamber that subsequently sinks. However, it is counterintuitive to use such a chamber to promote automatic sinking of an elongate element, such as a pipeline, at a desired point of a launch procedure.

Embodiments of the invention provide a passive variable buoyancy device for assisting in pulling an elongated structure into the sea. The passive variable buoyancy device comprises a caisson with at least one opening or lateral hole at a predetermined height from the bottom.

Embodiments of the invention implement a method for progressively submerging an elongated structure fabricated onshore. The method comprises mounting at least one passive variable buoyancy device such as an open-top caisson on a first end of the elongated structure and pulling the elongated structure into water. The buoyancy device is automatically flooded when a predetermined length of the elongated structure is in the water. The buoyancy device is suitably self-flooded.

The height of the opening or hole is calculated from the launched or immersed length of the elongated structure for which sinking should occur. The or each opening is suitably underwater when a predetermined length of the elongated structure is no longer supported by the seabed.

The caisson may be a cylinder, for example of steel, and may have an open top. The or each opening or hole may have a rectangular shape.

Thus, the invention provides a self-limiting buoyancy unit for launching a towed bundle, or an additional buoyancy aid for a towed structure. Preferred embodiments of the proposed buoyancy unit comprise an open-topped tubular assembly fabricated to a pre-determined height and attached to a bundle towhead or similar structure.

During bundle launch, the assembly will generate increasing buoyancy as the main bundle structure is advanced into increasing water depth. At a pre-determined point, prior to the overall bundle structure becoming buoyant, the buoyancy unit will start to flood by the water level exceeding the overall height of the open unit or by reaching the height of one or more pre-cut ports in a side wall of the buoyancy unit.

The purpose of the invention is to provide additional low-level buoyancy to assist with launch operations, and to allow for the effects of that buoyancy to be removed, when required, without physical intervention. Thus, a buoyancy unit of the invention adds increasing buoyancy during the initial launch phase from land to sea by means of displacement, and that additional buoyancy is lost or negated by free-flooding the buoyancy unit at a predetermined depth or distance from the shore.

Consequently, the invention enables short-term provision of buoyancy for structures in shallow water and removal of the generated buoyancy effect without intervention or operation of a mechanical device. The invention therefore provides an alternative to a fully-enclosed tank with either a remotely-activated or pressure-activated valve system.

BRIEF DESCRIPTION OF THE SEVERAL VIEWS OF THE DRAWINGS

To illustrate the context of the invention, reference has already been made to FIGS. 1 and 2 of the accompanying drawings in which.

Figure 4A:
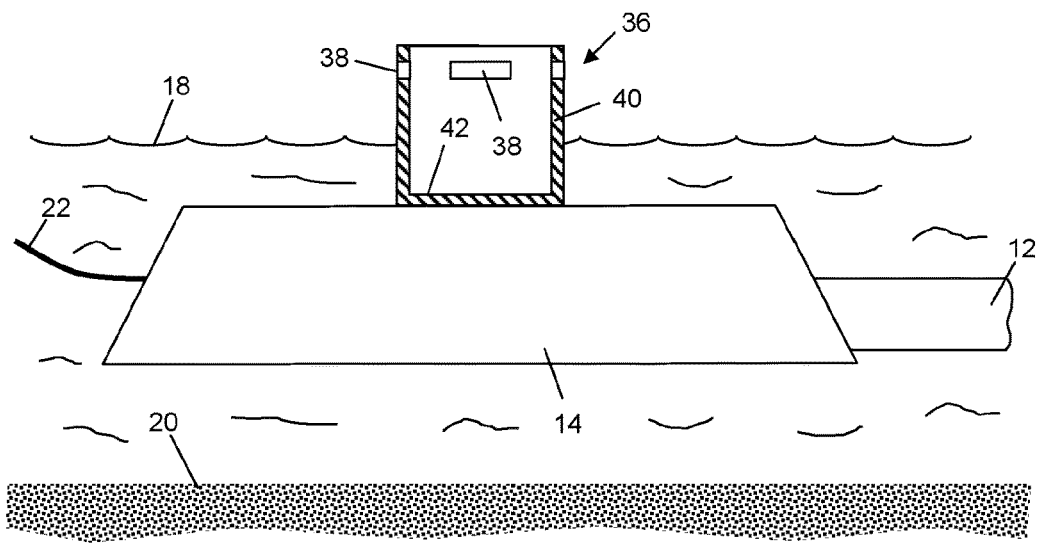
Figure 4B:
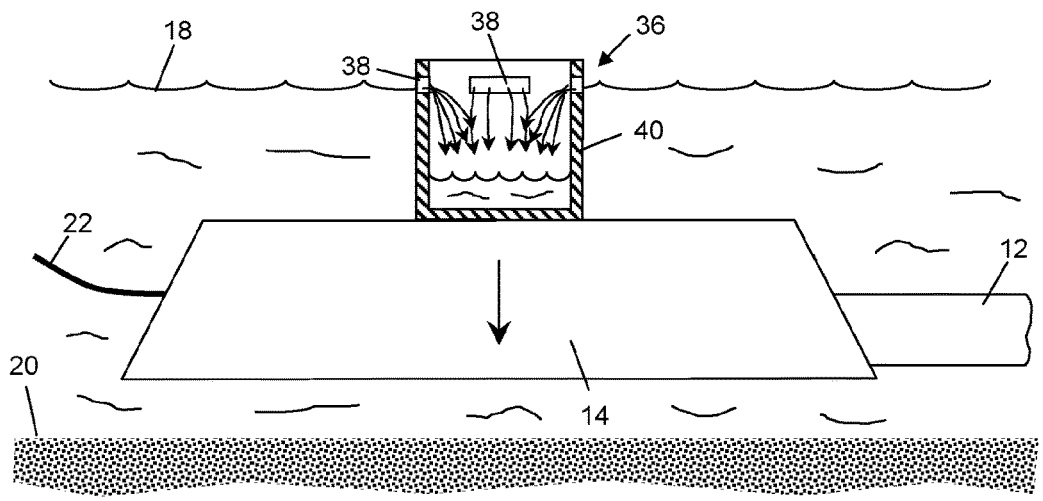
Figure 4C:
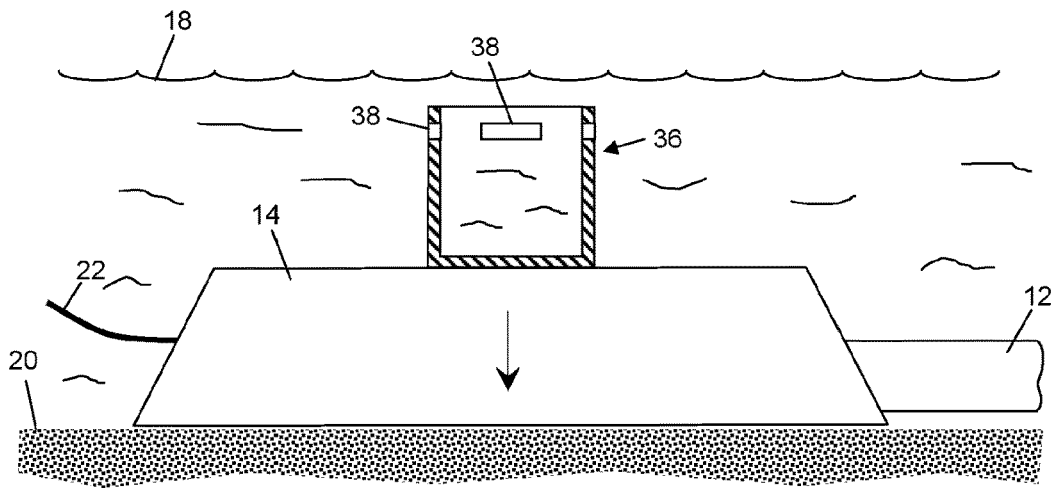
Figure 5A:
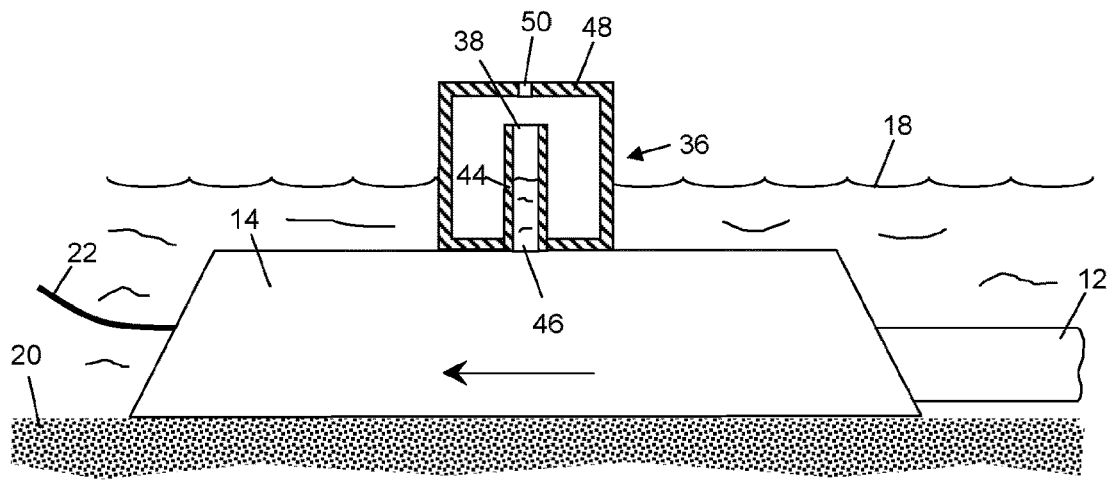
Figure 5B:
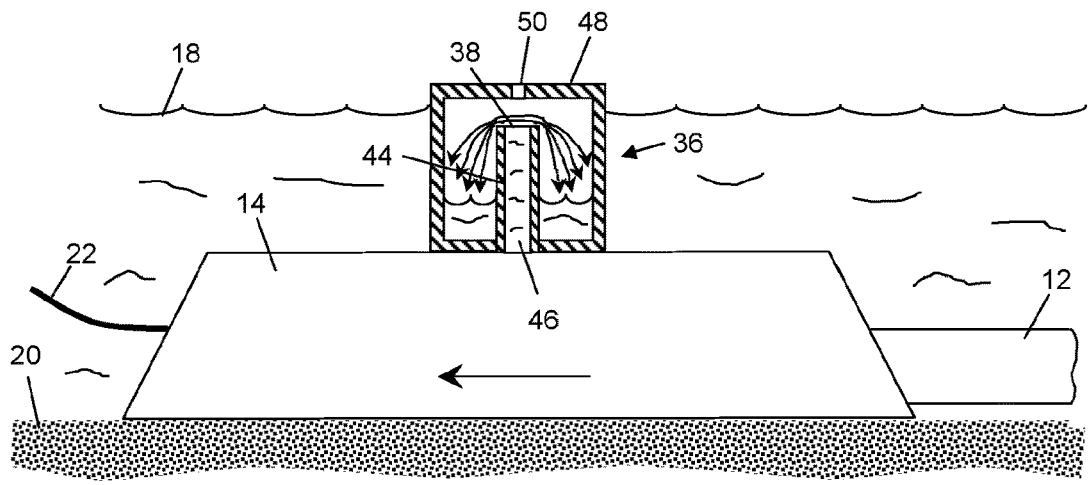
Figure 5C:
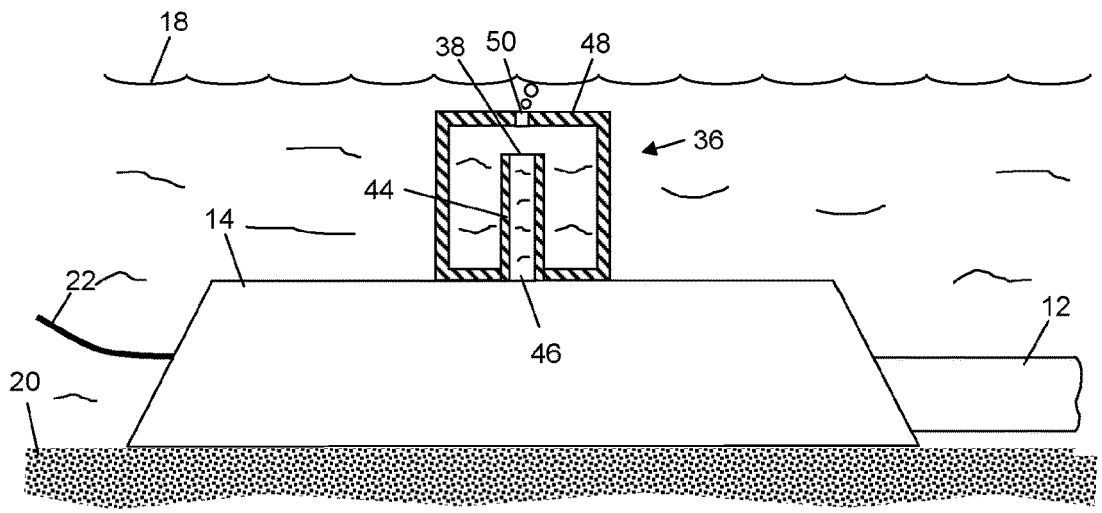

In order that the invention may be more readily understood, reference will now be made, by way of example, to the remainder of the accompanying drawings in which:

FIGS. 3a, 3b and 3c are a sequence of schematic side views of a pipeline bundle unit in accordance with the invention, being launched into the sea from a coastal spoolbase;

FIGS. 4a, 4b and 4c are a sequence of schematic part-sectioned side views of a leading towhead of the bundle unit shown in FIGS. 3a to 3c, as buoyancy applied to the towhead by a buoyancy device of the invention is automatically decreased; and FIGS. 5a, 5b and 5c are a corresponding sequence of schematic part-sectioned side views of a leading towhead of the bundle unit shown in FIGS. 3a to 3c equipped with a variant of the buoyancy unit shown in FIGS. 4a to 4c.

DETAILED DESCRIPTION OF THE INVENTION

Referring firstly to FIGS. 3a to 3c, like numerals are used for like features. Thus, a bundle unit 10 comprises a pipeline bundle 12, shown here shortened and interrupted, extending between a leading towhead 14 and a trailing towhead 16.

In FIG. 3a, the bundle unit 10 is shown ready for launch at a coastal spoolbase 30 where the bundle unit 10 was previously fabricated, tested and commissioned. The spoolbase 30 extends inland from a beach 32. In the offshore direction, the beach 32 shelves into the sea beneath the surface 18 to form a shallowly-inclined seabed 20. Consequently, the depth of the sea increases with increasing distance from the beach 32.

A line 22 connects a tug 24 to the leading towhead 14 to pull the bundle unit 10 from the spoolbase 30 into the sea. The pull of the tug 24 overcomes frictional forces that resist movement of the bundle unit 10. For additional control of the launch operation, a small degree of back-tension may be applied to the bundle unit 10. For example, a line 34 is shown attached to the trailing towhead 16 for this purpose.

The bundle unit 10 is equipped with one or more floodable buoyancy devices 36 of the invention. In this example, a buoyancy device 36 is mounted on top of each of the towheads 14, 16.

In other examples, the buoyancy devices 36 could be positioned differently with respect to the towheads 14, 16. For example, the buoyancy devices 36 could be beneath or beside the towheads 14,16. Such a lower, or lateral, position of the buoyancy devices 36 with respect to the towheads 14,16 would maintain the towheads 14,16 of other parts of the bundle unit 10 closer to the surface 18 or at the surface 18.

In further examples, only one of the towheads 14, 16 could be equipped with a buoyancy device 36 or there could be more than one buoyancy device 36 on one or both of the towheads 14, 16. Similarly, the pipeline bundle 12 could be equipped with one or more buoyancy devices 36.

The buoyancy devices 36 exemplified here are open-topped hollow caisson-like structures that confer buoyancy on the towheads 14, 16 by displacement upon immersion. The open top is an aperture through which each buoyancy device 36 may be flooded with seawater.

Each buoyancy device 36 has continuous side walls that are contiguous with a base. The side walls and the base may, for example, be of circular or rectangular shape in plan view.

The buoyant upthrust imparted by each buoyancy device 36 increases with increasing depth of immersion in the sea and hence with increasing displacement. Upthrust increases with increasing depth until the surface 18 overtops the side walls of the buoyancy device 36 and seawater begins to flood the hollow interior through the open top.

Flooding of the buoyancy device 36 reduces buoyancy and initiates sinking, which increases flooding and hence accelerates sinking. The substantial buoyant upthrust imparted by the buoyancy device 36 at the outset is thereby reduced to a negligible level.

Figure 1:
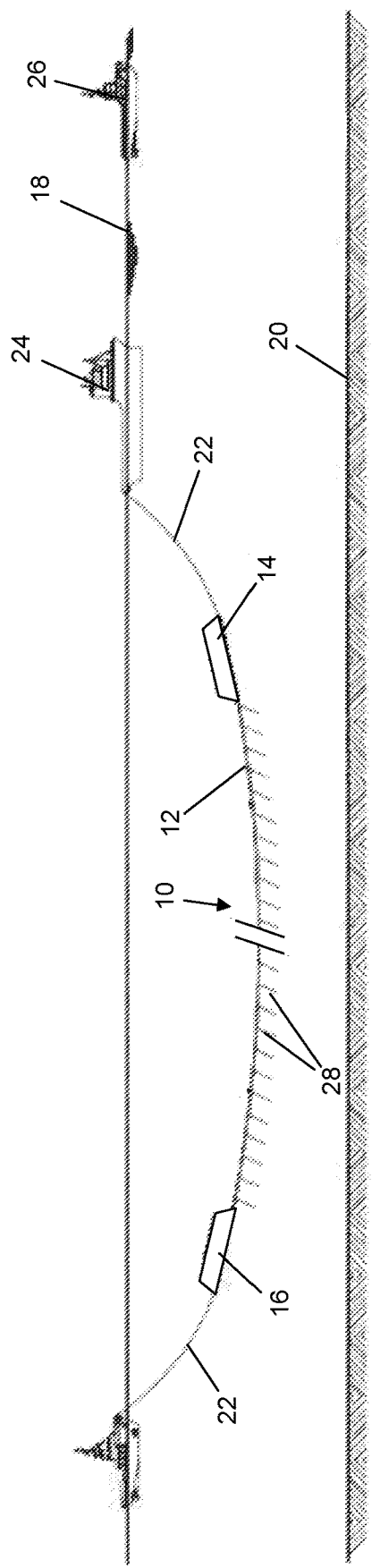
FIG. 1 is a schematic side view of a bundle unit comprising a pipeline bundle and two towheads, shown here being towed to a subsea installation site using the controlled depth towing method known in the prior art.

In the early stages of the launch operation shown in FIG. 3b, the leading towhead 14 has entered the sea, followed by a portion of the pipeline bundle 12 which extends across the beach 32. The pipeline bundle 12 has bent within elastic limits, under the weight of the leading towhead 14 that is negatively buoyant. The leading towhead 14 is fully submerged, along with a leading portion of the pipeline bundle 12 that is also negatively buoyant. In this respect, the pipeline bundle 12 is typically launched with ballast such as the chains 28 shown in FIG. 1 already attached at intervals along its length.

The buoyancy device 36 attached to the leading towhead 14 is partially submerged, thus imparting buoyant upthrust that offsets the negative buoyancy of the leading towhead 14 and of the pipeline bundle 12. The buoyant upthrust may be sufficient to confer positive buoyancy, as in this example, or at least to reduce the effect of negative buoyancy.

The buoyant upthrust of the buoyancy device 36 supports most or all of the apparent weight of the submerged leading towhead 14 and of the submerged leading portion of the pipeline bundle 12, which both remain clear of the seabed 20 in this example. A minor part of the apparent weight may be supported by a vertical component of tension in the line 22 that connects the tug 24 to the leading towhead 14.

As more of the bundle unit 10 is launched into the sea, an increasing portion of the negatively-buoyant pipeline bundle 12 becomes submerged. This exerts increasing apparent weight forces on the leading towhead 14 to which the buoyancy unit 36 is attached. Some of that increased apparent weight could be borne by tension in the line 22 that connects the tug 24 to the leading towhead 14. However, most or all of the weight is borne by increased displacement as more of the buoyancy unit 36 is pulled under the surface 18. The support of the buoyancy unit 36 controls the curvature of the pipeline bundle 12 and prevents overstressing.

Eventually, with submergence of an increasing length of the pipeline bundle 12 as shown in FIG. 3c, the buoyancy unit 36 is pulled down into the water to such an extent that the top of the buoyancy unit 36 drops under the surface 18. The buoyancy unit 36 then floods quickly though its open top and so ceases to contribute significant buoyancy, thus allowing the leading towhead 14 to settle onto the seabed 20. As the leading towhead 14 sinks, it pulls the leading portion of the pipeline bundle 12 away from the surface 18 and hence away from wave action that could increase fatigue.

Figure 2:
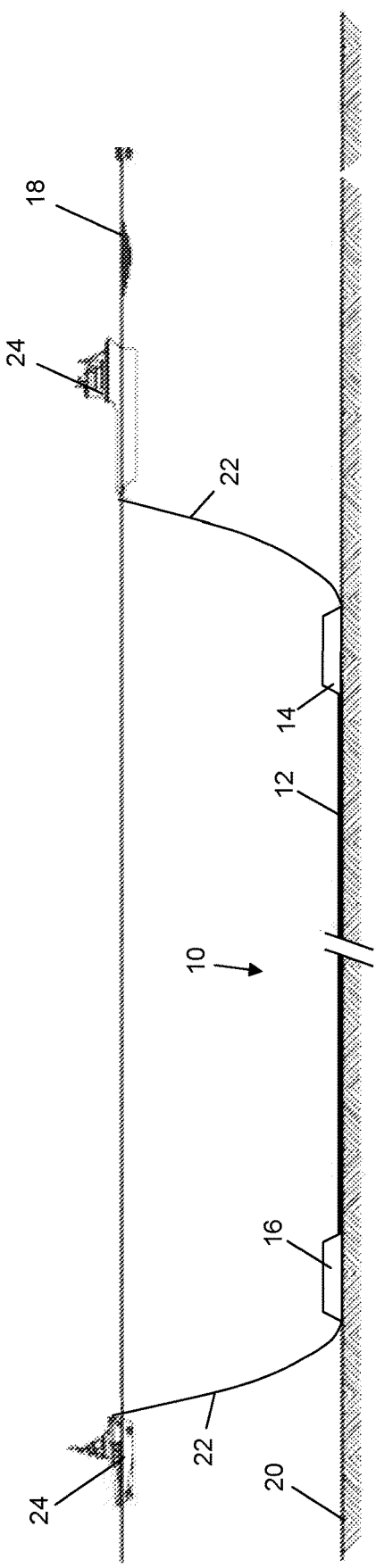
FIG. 2 is a schematic side view of the pipeline bundle of FIG. 1 now laid on the seabed.

The launch operation can then continue as the tug 24 pulls on the leading towhead 14 via the line 22. Eventually the trailing towhead 16 will enter the sea, where temporary buoyant support may be provided by a second buoyancy unit 36 attached to the trailing towhead 16. That buoyant support may be supplemented by hold-back tension in the line 34. Reducing the hold-back tension in the line 34 allows the trailing towhead 16 to sink away from the surface 18 as the attached buoyancy unit 36 also floods. A second tug 24 can then be connected to the trailing towhead 16 to allow the bundle unit 10 to be lifted from the seabed 20 and towed in mid-water to an installation site as shown in FIG. 2.

In another approach, it would be possible for both of the towheads 14, 16 to float simultaneously before the buoyancy unit 10 sinks as a whole onto the seabed 20.

In the variants shown in enlarged detail in FIGS. 4a to 4c and FIGS. 5a to 5c, like numerals are again used for like features.

FIGS. 4a to 4c show a variant of the buoyancy unit 36 in which apertures in the form of openings, slots or ports 38 penetrate the side wall 40. The top of the buoyancy unit 36 is open in this example but could be closed like that of the variant shown in FIGS. 5a to 5c. In this respect, the ports 38 are less susceptible than an open top to inadvertent or premature flooding due to overtopping of the buoyancy unit 36 by waves.

In this example, the ports 38 are elongated horizontally, being rectangles that are wider than they are high. In plan view, the ports 38 are distributed around the side wall 40 and are all at substantially the same height above the base 42 of the buoyancy unit 36. Other examples could have differently-shaped ports, for example being elongated vertically, or more or fewer ports, or ports that are positioned or distributed differently along or around the side wall 40.

FIG. 4a shows the buoyancy unit 36 empty of water and partially submerged to provide substantial buoyant upthrust to the attached leading towhead 14. This buoyant upthrust offsets the apparent weight of the leading towhead 14 and of the leading portion of the pipeline bundle 12, holding them clear of the seabed 20.

The ports 38 promote gradual or progressive flooding of the buoyancy unit 36 when a sufficient length of the pipeline bundle 12 has been launched into the sea and so exerts a weight force on the leading towhead 14 that exceeds a predetermined threshold.

Flooding begins when the buoyancy unit 36 sinks to an extent that brings the ports 38 beneath the surface 18, as shown in FIG. 4*b*. The inrushing water reduces buoyancy and causes the open top of the buoyancy unit 36 to sink beneath the surface 18, at which point flooding accelerates rapidly to completion. The leading towhead 14 and the leading portion of the pipeline bundle 12 then settle onto the seabed 20 by virtue of their negative buoyancy. If necessary, the descent of the leading towhead 14 and the leading portion of the pipeline bundle 12 onto the seabed 20 may be controlled by tension in the line 22 that connects the leading towhead 14 to the tug 24 (not shown).

FIGS. 5*a* to 5*c* show a further variant of the buoyancy unit 36 in which openings or ports 38 do not penetrate the side wall 40. Instead, an aperture in the form of a port 38 is defined by the top of a stand pipe or tube 44 that extends upwardly from an inlet 46 at a lower end to the port 38 at the upper end. In this example, the tube 44 extends upwardly from the base 42 and the inlet 46 penetrates the base 42.

The top of the buoyancy unit 36 is closed by a top panel 48 in the example shown in FIGS. 5*a* to 5*c* but could instead be open like that of the example shown in FIGS. 4*a* to 4*c*. Whilst contiguous with and attached to the side wall 40 around its periphery, the top panel 48 is suitably provided with one or more vents 50 to allow air to escape as the buoyancy unit 36 floods with water, as shown in FIG. 5*c*.

FIGS. 5*a* to 5*c* also differ from the preceding drawings in that the leading towhead 14 remains in contact with the seabed 20 throughout. Thus, the seabed 20 supports some of the apparent weight of the leading towhead 14 and of the submerged leading portion of the pipeline bundle 12. It follows that the depth of the water between the surface 18 and the seabed 20 determines whether the buoyancy unit 36 is submerged sufficiently as to flood.

Whilst the buoyant upthrust provided by the buoyancy unit 36 is not sufficient to confer positive buoyancy on the negatively-buoyant assembly comprising the leading towhead 14 and the leading portion of the pipeline bundle 22, that upthrust does reduce the apparent weight of that assembly. This reduces friction with the seabed 20 and also reduces tension in the line 22 that connects the leading towhead 14 to the tug 24 (not shown).

FIG. 5*a* shows the buoyancy unit 36 empty of water and partially submerged to provide substantial buoyant upthrust to the attached leading towhead 14. This buoyant upthrust reduces the apparent weight of the leading towhead 14 and of the leading portion of the pipeline bundle 12. The tube 44 is partially filled with water admitted through the inlet 46 in the base 42 but the level of that water has not yet risen to spill out of the tube 44 and into the buoyancy unit 36 through the port 38.

As a greater length of the pipeline bundle 12 is launched into the sea, the leading towhead 14 reaches sufficiently deep water that the port 38 at the top of the tube 44 sinks below the surface 18 as shown in FIG. 5*b*. Water rising from the inlet 46 up the tube 44 now spills through the port 38 into the buoyancy unit 36 as the water level rises above the top of the tube 44. This sharply reduces buoyant upthrust exerted by the buoyancy unit 36. Buoyant upthrust then continues to reduce progressively as the leading towhead 14 is pulled into deeper water and more of the buoyancy unit 36 is submerged.

Flooding continues until the buoyancy unit 36 sinks fully beneath the surface 18, as shown in FIG. 5*c*, whereupon flooding is complete and the buoyancy unit 36 ceases to contribute significant buoyant upthrust.

Many other variations are possible within the inventive concept. For example, two or more ports could be at a different heights above the base of the buoyancy unit, either penetrating the side wall like the ports shown in FIGS. 4*a* to 4*c* and/or defined by respective tubes like the port shown in FIGS. 5*a* to 5*c*. This would promote gradual or progressive flooding after the buoyancy unit sinks to an extent that brings the lower or lowest port beneath the surface, before one or more ports above that level also sink beneath the surface and hence accelerate flooding.

The invention claimed is:

1. A method of launching an elongate subsea structure into water, the method comprising:
   providing buoyant support to the structure by displacing water with a hollow buoyancy unit that applies buoyant upthrust to the structure; and
   by lowering the buoyancy unit in the water to bring at least one permanently open aperture of the buoyancy unit beneath a surface level of the water, flooding the buoyancy unit with water through the or each permanently open aperture to reduce the buoyant upthrust applied to the structure;
   wherein the method further comprises dragging at least part of the structure along a seabed while launching the structure.

2. The method of claim 1, comprising lowering the buoyancy unit to flood the buoyancy unit by lowering at least part of the structure in the water.

3. The method of claim 1, wherein launching the structure comprises launching a leading end of the structure into the water, flooding the buoyancy unit and subsequently launching a trailing end of the structure into the water.

4. The method of claim 1, comprising bending the structure elastically along a length of the structure during launching.

5. The method of claim 1, comprising pulling the structure from land into sea during launching.

6. The method of claim 5, comprising sinking at least part of the structure onto a seabed after reducing the buoyant upthrust applied by the buoyancy unit to the structure.

7. The method of claim 1, followed by lifting the structure from a position of the structure on a seabed, towing the structure to an installation site and sinking the structure at the installation site.

8. The method of claim 1, wherein flooding the buoyancy unit with water through the or each permanently open aperture comprises flooding the buoyancy unit through at least one permanently open aperture in a side wall of the buoyancy unit.

9. The method of claim 1, wherein flooding the buoyancy unit with water through the or each permanently open aperture comprises flooding the buoyancy unit through at least one permanently open aperture in a top of the buoyancy unit.

10. The method of claim 1, wherein flooding the buoyancy unit with water through the or each permanently open aperture comprises flooding the buoyancy unit through at least one permanently open aperture at an upper end of a duct that terminates within the buoyancy unit.

11. The method of claim 1, comprising submerging at least a majority of the buoyancy unit before lowering the or each open aperture beneath the surface level of the water.

12. The method of claim 1, comprising lowering the buoyancy unit in the water by increasing a total weight of the structure launched into the water.

13. The method of claim 1, comprising lowering the buoyancy unit in the water by increasing a length of the structure launched into the water.

14. The method of claim 1, comprising lowering the buoyancy unit in the water by advancing the structure into deepening water.

15. The method of claim 1, wherein flooding the buoyancy unit with water through the or each permanently open aperture comprises flooding the buoyancy unit through a second permanently open aperture after flooding the buoyancy unit through a first permanently open aperture.

16. The method of claim 15, comprising lowering the buoyancy unit after flooding through the first open aperture and before flooding through the second open aperture.

17. The method of claim 1, comprising applying buoyant upthrust to a towhead of the structure.

18. The method of claim 1, comprising also supporting the structure by applying tension to a line attached to the structure.

19. The method of claim 1, wherein the structure is negatively buoyant without the buoyant upthrust applied by the buoyancy unit.

\* \* \* \* \*